Patented Jan. 10, 1933

1,894,231

UNITED STATES PATENT OFFICE

ALBERT M. CLIFFORD, OF STOW, OHIO, ASSIGNOR TO THE GOODYEAR TIRE & RUBBER COMPANY, OF AKRON, OHIO, A CORPORATION OF OHIO

ANTIOXIDANT

No Drawing.   Application filed September 14, 1931.   Serial No. 562,828.

My invention relates to methods of preserving organic materials. More particularly it relates to methods of preserving rubber, balata and similar rubber-like substances.

An object of the invention is to provide a method of treating materials of the above indicated character whereby to retard the decay and resultant loss of tensile strength and elasticity thereof, occasioned by the attacks of atmospheric oxygen, sunlight and heat. Another object is to provide a rubber product having the characteristics referred to. Other objects and advantages will become apparent from the following description.

Heretofore, it has been observed that certain organic substances, such as reaction products of aldol and alpha naphthylamine, hydroquinone and similar substances, when incorporated in rubber, have the effect of retarding the action of oxygen, sunlight and heat which, under ordinary circumstances, cause premature decay and degeneration of rubber materials. Although many substances having similar age retarding properties are known to the industry, most of such materials heretofore employed for this purpose are objectionable for various reasons; for example, some of them are poisonous to the workmen employed in handling them, and in order to use them in commercial practice, it has been necessary to take great precautions to overcome these effects. Still other materials are only mildly antioxidant in their properties or are objectionable because they can not be incorporated in the rubber except by subjecting the latter to excessive milling operations or because they are too expensive for commercial application.

My invention resides in the discovery that certain derivatives of that fraction of coal tar which boils between 265° and 400° C., termed the methyl naphthalene or anthracene oil fraction, when incorporated in rubber, constitute excellent preservatives thereof. As a specific example of this class, attention is called to the amino derivative of phenanthrene probably having the formula

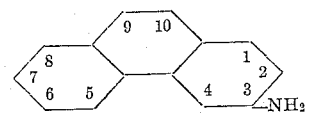

This compound may readily be prepared by nitrating phenanthrene in any convenient manner and subsequently reducing the nitro derivatitve with iron filings and hydrochloric acid or ammonium chloride. The material may be obtained from the reduction mixture in a state of sufficient purity for commercial application merely by extraction with a suitable organic solvent and then allowing the compound to crystallize from the solution. The melting point of aminophenanthrene as obtained by this procedure is from 85 to 88° C. For references, see Beilstein XII, 1337 and Richter II, 688. The compound thus obtained may be added with satisfactory results to substantially any of the ordinary rubber compounds. However, the following is an example of a formula which has been found by actual experience to be particularly satisfactory:

| | Parts |
|---|---|
| Pale crepe rubber | 100 |
| Zinc oxide | 5 |
| Sulfur | 3 |
| Hexamethylene tetramine | 1 |
| Stearic acid | 1.5 |
| Antioxidant | 1 |

One set of test sheets, prepared in accordance with the preceding formula, was subjected to what is termed a "low temperature" accelerated age test, being placed in an oxygen bomb under a pressure of 150 pounds of oxygen per square inch and at a temperature of 50 degrees C. for a period of six days. At the conclusion of this period of artificial aging, the sheets were removed from the bomb and subjected to physical tests in order to ascertain the tensile strength and elasticity thereof.

A second set of exactly corresponding test sheets was subjected immediately to physical tests in order to ascertain the tensile strength and elasticity thereof prior to aging. The results of these tests are tabulated as follows:

| Cure | | Stress kgs./cm² at | | Tensile at break | Elong. at break | Percent weight increase |
|---|---|---|---|---|---|---|
| Time in mins. | Temp. F° | 500% elong. | 700% elong. | | | |
| Low temperature test | | | | | | |
| Amino phenanthrene | | | | | | |
| Original | | | | | | |
| 35 | 285 | 12 | 36 | 102 | 870 | |
| 50 | 285 | 17 | 61 | 124 | 820 | |
| 70 | 285 | 25 | 105 | 170 | 775 | |
| Aged six days in oxygen bomb | | | | | | |
| 35 | 285 | 18 | 60 | 108 | 805 | |
| 50 | 285 | 25 | 86 | 127 | 770 | .12 |
| 70 | 285 | 34 | 130 | 150 | 725 | .15 |

By comparison of the results obtained from the artificially aged samples and the original samples before aging, it will be apparent that the samples containing the new antioxidant resist deterioration caused by oxygen to a remarkable degree even in the relatively severe conditions existing in the oxygen bomb. In fact, it would appear that the condition of the samples was somewhat improved by such treatment. A rubber compound containing no antioxidant, upon being subjected to similar conditions, is reduced to a resinous mass substantially void of tensile strength and elasticity.

It is to be understood that the invention is not limited to the use of the simple mono amino phenanthrene but it also includes poly amino substituted phenanthrenes, as well as reaction products of either the mono or poly amino substituted phenanthrenes. For example, any of the above described phenanthrene compounds may be reacted with aldehydes, such as formaldehyde, acetaldehyde, propionaldehyde, butyraldehyde, heptaldehyde, crotonaldehyde, acrolein and aldol. They may also be reacted with lower members of the fatty acid series such as formic acid. It is also possible to form reaction products with the phenolic compounds such as alpha and beta naphthol. All of these latter materials may be employed in stocks of the character indicated in connection with amino phenanthrene or in stocks of similar character with excellent results.

These antioxidants are particularly desirable from a commercial viewpoint because the phenanthrene constituting the basic ingredient is obtained as a coal tar product for which there is little use at the present time. By nitrating, reducing and further reacting this otherwise useless material with either aldehydes, fatty acids, or phenolic compounds, excellent antioxidants of rubber may be obtained. In addition to being excellent preservatives in the rubber in which they are incorporated, these antioxidants are substantially non-odorous and non-toxic, are relatively soluble in rubber and may be incorporated in that material with ease.

It is to be understood that the phenanthrenes used in this invention are not limited to the coal tar fraction cited, but those found in any other source may be used also.

Although I have illustrated but the preferred forms of the invention, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of preserving rubber which comprises subjecting it to vulcanization in the presence of a primary amino derivative of phenanthrene.

2. A rubber product that has been vulcanized in the presence of a primary amino derivative of phenanthrene.

3. A rubber product that has been vulcanized in the presence of 3-amino phenanthrene.

4. A method of preserving rubber which comprises subjecting it to vulcanization in the presence of amino phenanthrene.

5. A rubber product that has been vulcanized in the presence of amino phenanthrene.

In witness whereof, I have hereunto signed my name.

Signed at Akron, in the county of Summit and State of Ohio, U. S. A., this 12th day of September, 1931.

ALBERT M. CLIFFORD.